June 13, 1967 J. A. ROJIC ET AL 3,324,980

ELASTOMER CAGE FOR SPRAG MEMBERS

Filed July 6, 1965 2 Sheets-Sheet 1

Inventors:
Daniel M. Wade
Robert J. Curran
and John A. Rojic
By: Herman E. Smith Atty.

June 13, 1967 J. A. ROJIC ET AL 3,324,980
ELASTOMER CAGE FOR SPRAG MEMBERS
Filed July 6, 1965 2 Sheets-Sheet 2
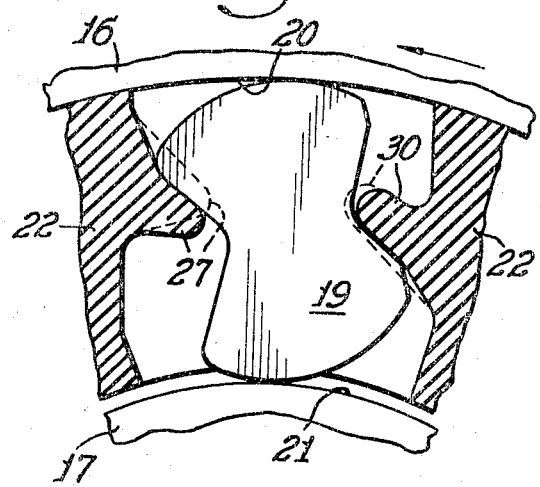
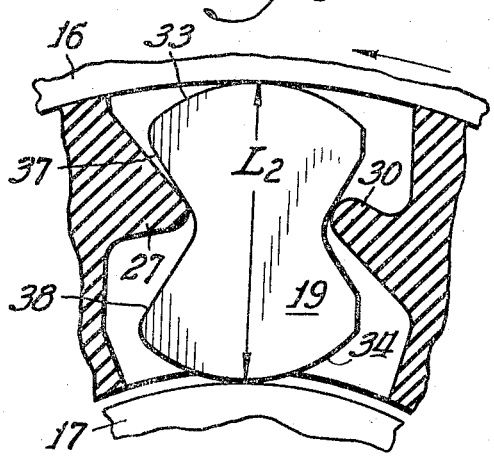
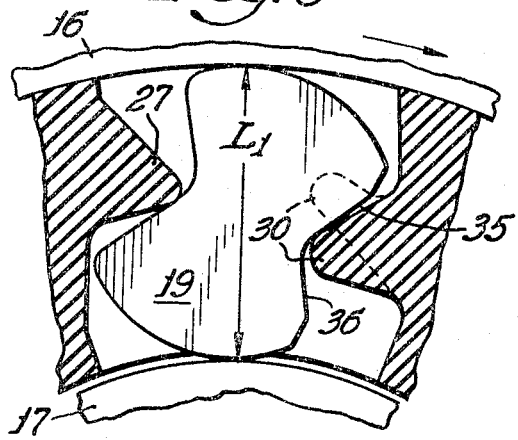
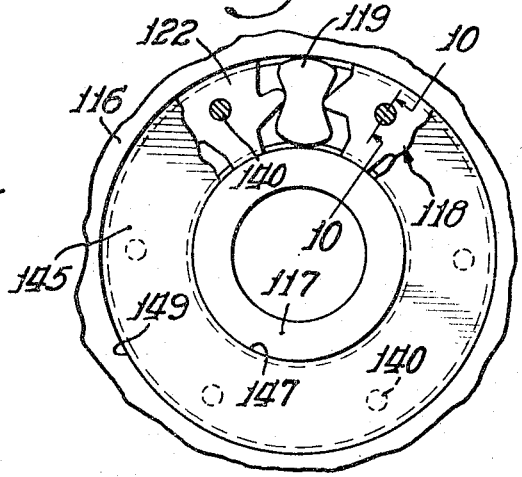
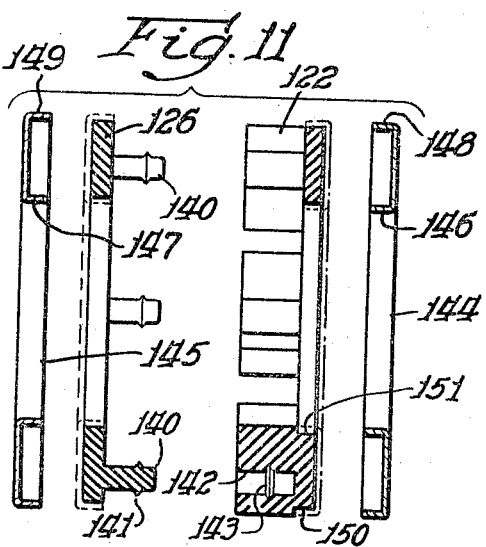
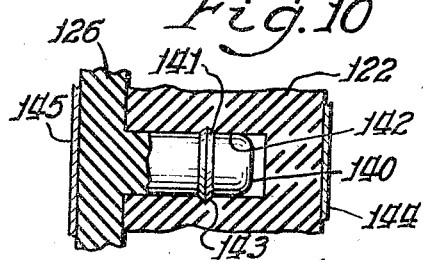
Inventors:
Daniel M. Wade
Robert J. Curran
and John A. Rojic
By: Herman E. Smith Atty.

United States Patent Office 3,324,980
Patented June 13, 1967

3,324,980
ELASTOMER CAGE FOR SPRAG MEMBERS
John A. Rojic, Downers Grove, Daniel M. Wade, River Forest, and Robert J. Curran, Elmhurst, Ill., assignors to Borg-Warner Corporation, Chicago, Ill., a corporation of Illinois
Filed July 6, 1965, Ser. No. 469,450
11 Claims. (Cl. 192—45.1)

ABSTRACT OF THE DISCLOSURE

An overrunning clutch assembly includes a complement of sprags pocketed in apertures in a cage having projections of elastomeric material extending from the walls thereof into engagement with the sprags, one projection provides a fulcrum about which the sprag is tilted for engagement and disengagement while an adjacent projection is adapted to undergo plastic flow to serve as both an elastic stop and an energizing member for controlling the tilting of the sprag, an adjacent pair of projections form an elastic restriction for retaining the sprags in place in the cage when handled as a subassembly, the cage can be axially separable, and relatively inelastic backing members may be incorporated to impart dimensional stability to the cage.

---

This invention relates generally to one-way clutches and more particularly to a sprag carrier therefore.

An accomplishment of the invention is to improve the construction of one-way clutches of the type which includes a pair of concentric rotatable members arranged to be coupled and uncoupled by a group of tiltable sprags. Such sprags are customarily arranged in an annular configuration having their opposite end portions in frictional engagement with the inner and outer rotatable members. These sprags serve to interlock the members or release the members as the sprags are tilted within the annular recess by rotation of the members. Thus, the clutch is automatically conditioned for driving or overrunning operation responsive to the direction of rotation of the members.

The tilted attitude of the sprags is critically important in order to assure smooth operation in which the driving loads are shared equally among the sprags. Where the load is transmitted through only a few of the sprags a condition known as "roll over" can occur. In this condition, the driving torque may force one or more of the sprags over center resulting in failure through permanent deformation of either the sprag or engaging races of the rotatable members.

Another condition to be avoided is known as "pop out" in which the sprags tilt to an extreme overrunning position and jam out of contact with one of the race members. The cause of "pop out" is the sudden release of the load, or slip, which may occur if contaminants enter the one-way clutch assembly. After "pop out" has occurred, one or more of the sprags may fail to engage upon initiation of reverse rotation. In order to overcome the above described problems of "roll over" and "pop out," annular cages are provided for spacing the sprags which include sprag operating means for controlling the tilted attitude of the sprags. A feature of this invention is to provide a sprag carrier, or cage, formed of elastically resilient rubber-like material including recesses for both locating the sprags and controlling their tilted attitude.

The character and objects of the invention will be more fully appreciated from reference to the following description together with the drawings, in which a preferred embodiment thereof is shown and described.

Figure 1:
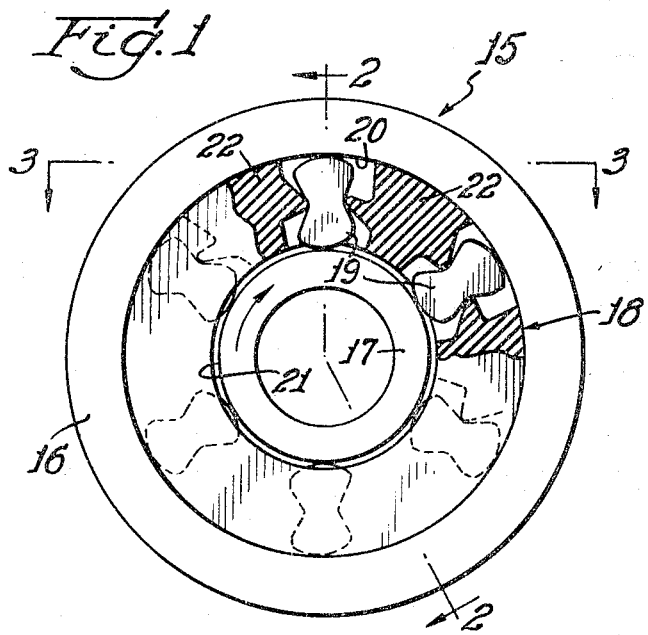
Figure 2:
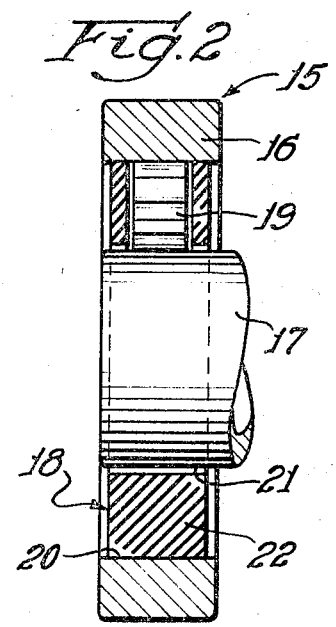
Figure 3:
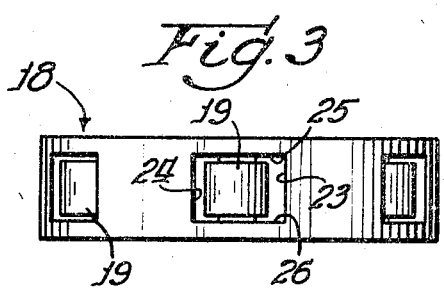
Figure 4:
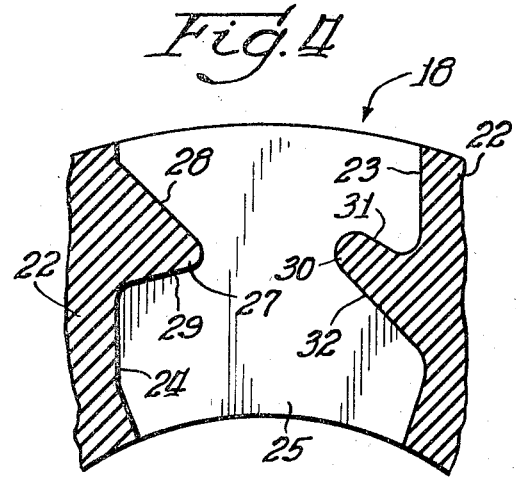
Figure 5:
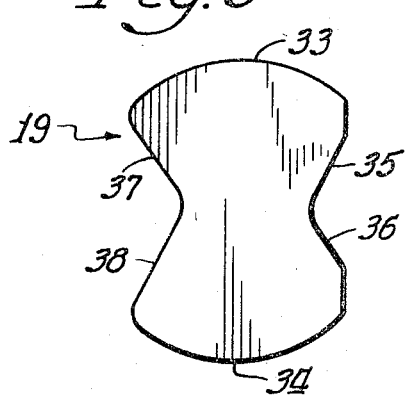

In the drawings:
FIGURE 1 is a side elevation view of a one-way clutch assembly with portions broken away to more clearly disclose the internal construction thereof;
FIGURE 2 is a section view taken substantially along the line 2—2 of FIGURE 1;
FIGURE 3 is a view of the sprag carrier taken substantially along line 3—3 of FIGURE 1;
FIGURE 4 is an enlarged fragmentary section view of a portion of the cage, showing the configuration of a sprag cavity in greater detail;
FIGURE 5 is an enlarged view of a sprag particularly adapted for use in the present invention;
FIGURE 6 is an enlarged fragmentary view illustrating normal driving relationship between the sprag, cage, and rotatable members;
FIGURES 7 and 8 are similar to FIGURE 6 and illustrate highly loaded and overrunning conditions of the clutch respectively;
FIGURE 9 is a view similar to FIGURE 1 illustrating a modified form of the invention;
FIGURE 10 is an enlarged fragmentary section view taken substantially along the line 10—10 of FIGURE 9; and
FIGURE 11 is an exploded view of the modified construction shown in FIGURE 9.

Referring now in greater detail to the drawings and particularly to FIGURE 1 thereof, there is shown an overrunning clutch assembly 15. The clutch includes an outer rotatable member 16 arranged concentrically about an inner rotatable member 17 having an annular cage 18 with a plurality of sprags 19 disposed in the space therebetween. Outer member 16 is provided with a cylindrical engaging surface 20 adapted to frictionally engage one end of the sprags 19. The other ends of sprags 19 are in frictional contact with a complementary cylindrical engaging surface 21 on inner member 17. Sprags 19 and cylindrical engaging surfaces 20 and 21 cooperate to provide a one-way clutch effective to couple the members in response to relative rotation in one direction and to release the members responsive to reversal of relative rotation. In the coupled condition one of the members is effective to drive the other member and in the released or overrunning, condition the members may be rotated independently of each other.

The cage or carrier 18 is preferably formed of a highly elastic, resilient, elastomeric material having rubber-like properties. Cage 18 is provided with a series of pockets defining a plurality of circumferentially spaced segments 22 and radially extending passages. The passages are further defined by side walls 23 and 24 and end walls 25 and 26.

As shown more fully in FIGURE 4, the sidewall 24 is provided with an axially extending rib-like locating tab 27 projecting into the passage. This locating tab 27 is generally triangular in cross section being formed of converging surfaces 28 and 29 to provide a relatively stiff yet resilient fulcrum about which the sprag can be tilted. Corresponding sidewall 23 is provided with a cooperating axially extending rib-like energizing tab or finger 30 projecting into the passage toward tab 27. Energizing finger 30 is formed by the surfaces 31 and 32 extending circumferentially and radially outward from wall 23 to provide a cantilevered operating member having a relatively flexible end portion projecting from a relatively thick base portion.

Referring now to FIGURE 5, the sprag 19 is provided with curved end or cam surfaces 33 and 34 which are diametrically diverging with respect to each other to provide a wedging action as the sprag is tilted. The preferred cam surfaces are described in U.S. Patent 3,019,873 (Ferris et al.). Sprag 19 has indented side surfaces 35, 36 and 37, 38 providing an hourglass configuration. It should be noted that the converging side surfaces 37, 38 have a greater included angle than the cooperating surfaces 28 and 29 of locating tab 27.

The cooperation of locating tab 27 and energizing tab 30 with sprag 19 under various conditions of operation will be more readily understood from comparison of FIGURES 6, 7, and 8. Referring first to FIGURE 8, the overrunning condition of the clutch is illustrated in which the outer member 16 has tilted sprag 19 into a position such that its least diametral dimension L1 is exhibited to rotatable members 16 and 17. It is apparent from an inspection of FIGURE 8, that further tilting of sprag 19 would result in the "pop-out" condition described above. Comparison of the broken line and full line positions of energizing finger 30, in FIGURE 8, illustrates the "pop-out" protection provided by the present invention. As sprag 19 is tilted in the "pop-out" direction by the overrunning members, the finger 30 undergoes plastic flow, changing from an elongated cantilever beam-like configuration to a triangular shape configuration in which further tilting forces are directed through the base portion. This change in configuration provides a progressively increasing resistance to tilting movement of the sprag in the "pop-out" direction. The energizing tab 30 thus provides an elastic stop for limiting tilting movement of the sprag.

Referring now to FIGURE 6, it is seen that outer member 16 has been reversed in direction of rotation and that energizing tab 30 has recovered its normal configuration thereby releasing energy to bias sprag 19 against outer member 16. Inasmuch as sprag 19 is continuously urged into engagement with member 16 during the over-running condition, the reversal of rotation is immediately effective to tilt sprag 19 into the upright position, shown in FIGURE 6, in which the slightly longer dimension L2 is exhibited to the engaging surfaces of members 16 and 17 to provide a driving connection therebetween.

The relationship of the elements under highly loaded operating conditions is illustrated in FIGURE 7 where interference between the sprag and cage is illustrated. The resiliently yieldable properties of the cage material will thus tolerate over-loaded operation of the clutch without failure of the sprag operating device. It is thus unnecessary to provide additional clearance which would result in less accurate positioning of the sprag. It is also apparent that the cage, possessing these qualities of yieldable resilience, can be manufactured within normal tolerances without sacrificing the quality of operation.

A further advantage of this cage construction is that the energizing finger 30 can be made sufficiently flexible to permit radial installation of the sprags within the cage. Once assembled, the sprag and cage can be handled as a separate unit without the problem of losing of misaligning the sprags.

While we have shown and described a preferred embodiment of our invention, in which the sprag and cage are assembled by inserting the sprag radially into the passageway, it is desirable to provide an alternate embodiment of the invention in which the sprag can be inserted axially into the carrier. FIGURES 9, 10, and 11 of the drawings illustrate modifications to the basic structure which permit axial assembly of the sprags while preserving the benefits of the resilient locating and energizing tabs.

In this alternate form of the invention, the clutch assembly comprises an outer rotatable member 116, an inner rotatable member 117, the sprags 119, and the sprag carrier 118, 126. In this construction, the annular end wall 126 is axially separable from the main body of the cage to provide access to the passage. As shown more clearly in FIGURES 10 and 11, the annular endwall 126 is provided with plugs 140 having rings 141 for alignment with corresponding sockets 142 in segments 122. These sockets 142 are provided with grooves 143 which cooperate with the rings 141 of plug 140 to provide a yieldable connector device for releasably securing the annular endwall 126 to the main body of the cage. The two piece cage can be made in simpler molds than is required for the one piece cage. The separable endwall 126 provides a further important advantage in that it need not be made of the same material as the main portion of the carrier 118. For example, it may be made of a less pliable material in order to impart greater dimensional stability to the entire cage assembly.

Another modification of the invention resides in the provision of the annular backing members 144 and 145. The cage unit 18 or 118 can be tightly fitted with respect to one of the rotating members while having running clearance with respect to the other. As shown in the drawings, the cage is tightly fitted in the outer member 16 or 116 and has running clearance with respect to the inner member 17 or 117. If desired the cage could be tightly fitted on the inner member and have clearance with respect to the outer member. As shown particularly in FIGURE 11, backing members 144 and 145 are provided with inturned rims 146, 148, and 147, 149. The cage is provided with a shoulder 150 engageable with the rim 148 so that it has a tight fit in the outer rotatable member. The cage is also provided with an inner shoulder 151 engageable with rim 146 so dimensioned and proportioned that running clearance is provided between the inner surface of the cage and the outer surface of the rotatable member 17 or 117. In this alternate construction the rims 146 and 147 function as bearings, rotatable with respect to the inner member 17 or 117. Thus the backing members 144 and 145 serve both as bearings and as a means for preserving the dimensional integrity of the relatively pliable sprag carrier. When used as shell type bearings, the backing members 144 and 145 may be made of bronze or other bearing material.

While we have shown and described a preferred embodiment of our invention together with alternate constructions thereof, it is to be understood that other forms and modifications can be practiced within the spirit of the invention and the scope of the following claims.

We claim:

1. A sprag clutch assembly comprising: a driving member and a driven member, relatively rotatable in driving and overrunning directions with respect to each other, and disposed concentrically about an axis in spaced relation to each other defining an annular space therebetween; an annular carrier member disposed between said driving and driven members provided with a series of arcuately spaced apertures extending radially through said carrier communicating with said driving and driven members; a plurality of sprags each rockingly disposed in a respective aperture of said carrier having wedging end surfaces adapted to interlock said members responsive to rocking movement in one direction and being disengageable from said members responsive to rocking movement in the other direction, each sprag having an indented side portion; and a plurality of elastically resilient energizing tabs of rubberlike material in said carrier, each projecting into a respective aperture for engagement with the indented side portion of a respective sprag, said tab resiliently urging said sprag into engagement with said members when rotating in the driving direction and providing a resilient stop for said sprag when said members are rotating in the overrunning direction.

2. A sprag clutch assembly comprising: a driving member and a driven member, relatively rotatable with respect to each other, and disposed concentrically about an axis in spaced relation to each other defining an annular space therebetween; an annular carrier member disposed between said driving and driven members provided with a series of arcuately spaced apertures extending radially through said carrier communicating with said driving and driven members; a plurality of elastically resilient energizing tabs in said carrier, each tab projecting generally circumferentially into a respective aperture and normally inclined in a radially outward direction, said tab being formed of an elastomeric material and being resiliently flexible and elastically deformable; and a plurality of sprags disposed in said carrier for rocking movement responsive to the direction of rotation of said members, each sprag having diametrically diverging curved end surfaces adapted to wedgedly interlock said members in driving relationship responsive to rocking movement in one direction and to disengage said members for overrunning relationship responsive to rocking movement in the other direction, each sprag having an indented side portion engageable with a respective tab by which said sprag is urged in said one direction and limited in said other direction by the flexure and compression of said tab.

3. A sprag clutch assembly comprising: a driving member and a driven member, relatively rotatable in driving and overrunning relationship with respect to each other, and disposed concentrically about an axis in spaced relation to each other defining an annular space therebetween;

a plurality of spaced tiltable sprags disposed in the annular space between said members, each sprag having curved wedging end surfaces engageable with said members adapted to interlock said members in driving relationship responsive to relative rotation of said members in one direction and to release said members in overrunning relationship responsive to relative rotation of said members in the other direction, each of said sprags having an indented side portion located between said end surfaces; and an annular cage of elastomeric material disposed within the space between said members including a plurality of circumferentially spaced pockets providing enclosures for said sprags, each of said pockets defining a pair of opposing arcuately spaced radially extending sidewalls, one of said sidewalls in each pocket having formed thereon a cantilevered energizing finger projecting into said pocket and engaging the indented side portion of a respective sprag, said finger providing an elastic stop for limiting the tilting movement of said sprag when said members are rotating in the overrunning relationship and continuously urging said sprag into engagement with said members when said members are at rest and when rotating in driving relationship.

4. A sprag clutch assembly comprising: a driving member and a driven member, relatively rotatable in driving and overrunning relationship with respect to each other, and disposed concentrically about an axis in spaced relation with each other defining an annular space therebetween;

a plurality of spaced tiltable sprags disposed in the annular space between said members, each sprag having curved wedging end surfaces engageable with said members adapted to interlock said members in driving relationship responsive to relative rotation of said members in one direction and to release said members in overrunning relationship responsive to relative rotation of said members in the other direction, each of said sprags provided with a pair of indentations on opposite sides thereof; and an annular cage of elastomeric material disposed within the space between said members including a plurality of circumferentially spaced pockets providing enclosures for said sprags, each of said pockets defining a pair of opposing arcuately spaced radially extending sidewalls, one of said sidewalls in each pocket having formed thereon a cantilevered energizing finger projecting into said pocket and engaging one of the indentations of a respective sprag, said finger providing an elastic stop for limiting the tilting movement of said sprag when said members are rotating in overrunning relationship and continuously urging said sprag into engagement with said members when said members are at rest and when rotating in driving relationship, said other sidewall having a locating tab projecting into said pocket engaging the other indentation of said sprag, said locating tab being relatively stiffer than said energizing finger and adapted to position said sprag within said pocket for cooperation with said energizing finger.

5. The structure according to claim 4 in which said locating tab is formed of a pair of converging surfaces, and the said other indentation of said sprag is formed of a pair of cooperating converging surfaces, said sprag surfaces being disposed at a greater included angle than said tab surfaces, said locating tab providing a fulcrum about which said sprag is tiltable by said finger and being resiliently yieldable when said sprag is tilted into interference with said tab by relative rotation of said members.

6. A carrier and sprag assembly for a one-way clutch including an annular cage having a plurality of sprags mounted therein; said cage being formed of resilient elastomeric material with a plurality of circumferentially spaced pockets extending radially therethrough, each pocket defined by first and second arcuately spaced walls, said first wall having a relatively flexible resilient energizing finger extending therefrom into said pocket, and said second wall having a relatively stiffer resilient locating tab extending into said pocket toward said finger; each of said sprags mounted in a respective pocket and having opposed indented side portions thereof engageable respectively with said locating tab and energizing finger, said indented side portions cooperating with said tab and finger to tilt said sprag in said pocket and to retain said sprag against separation from said cage.

7. An annular cage for carrying the sprags of a sprag clutch, said cage being formed of rubber-like material and being provided with circumferentially spaced passages extending radially therethrough, each passage defining a pair of axially spaced walls and a pair of arcuately spaced locating walls, one of said locating walls having an axially extending locating rib of triangular cross section extending into said passage, the other of said locating walls having an axially extending flexibly resilient energizing rib projecting cantilever fashion into said passage toward said locating rib, said locating rib and energizing rib forming an elastic restriction in said passage providing means for tilting a sprag with respect to said passage while securing the same against radial displacement therefrom.

8. An annular cage for carrying the sprags of a sprag clutch, said cage being formed of rubber-like material and having a pair of annular end walls spaced axially from each other by circumferentially disposed segments defining a plurality of passages extending radially through said cage, said segments including locating and energizing projections extending into said passages forming a restriction therein for retaining a sprag against radial displacement therefrom, one of said annular endwalls being detachable secured to said cage to provide axial access to said passages.

9. The structure according to claim 8 in which said segments are provided with sockets and said detachable sidewall is provided with cooperating plugs, said plugs and sockets being provided with elastic ring and groove connectors for securing said endwall to said cage, said connectors being resiliently yieldable to permit repeated assembly and disassembly of said sidewall and cage.

10. In a sprag clutch assembly having concentrically arranged relatively rotatable driving and driven members defining an annular space therebetween;

an elastic annular cage of rubber-like material disposed within said space, said cage having a radial dimension slightly less than the radially dimension of said space, and provided with a plurality of circumferentially spaced passages extending radially therethrough, said cage having resilient operating means within said passages;

a plurality of sprags disposed within respective passages of said cage in cooperating engagement with said operating means, said sprags being urged into engagement with said members by said operating means and being tilted into interfering relationship with said cage by relative rotation between said driving members; and at least one relatively inelastic annular backing member engageable with a portion of said cage adapted to accurately position said cage within said annular space.

11. A sprag clutch assembly comprising: a pair of relatively rotatable members disposed concentrically about an axis in spaced relation to each other defining an annular space therebetween;

a plurality of spaced tiltable sprags disposed between said members adapted to interlock said members responsive to relative rotation in one direction and to release said members responsive to relative rotation in the other direction;

an annular cage of elastic rubber-like material disposed within the space between said members including pockets enveloping said sprags for positioning said sprags concentrically with respect to said members; and a pair of backing members secured to opposite sides of said cage, each having an inturned rim portion forming a bearing surface journalled on one of said rotatable members, said backing members maintaining said cage in concentricity with the said one rotatable member.

References Cited

UNITED STATES PATENTS

| | | | |
|---|---|---|---|
| 2,520,004 | 8/1950 | Gondek | 192—45.1 |
| 2,624,436 | 1/1953 | Gamble | 192—45.1 |
| 2,677,449 | 5/1954 | Wavak | 192—45.1 |
| 2,824,635 | 2/1958 | Troendly et al. | 192—45.1 |
| 2,912,086 | 11/1959 | Troendly et al. | 192—45.1 |

BENJAMIN W. WYCHE III, *Primary Examiner.*